United States Patent
Izuhara et al.

(10) Patent No.: US 9,944,284 B2
(45) Date of Patent: Apr. 17, 2018

(54) RECOGNITION SUPPORT SYSTEM

(71) Applicant: DENSO CORPORATION, Kariya, Aichi-pref. (JP)

(72) Inventors: Hideshi Izuhara, Kariya (JP); Hiroaki Niino, Kariya (JP); Yousuke Hattori, Kariya (JP); Masayoshi Ooishi, Kariya (JP); Hiroki Tomabechi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/302,834

(22) PCT Filed: Mar. 24, 2015

(86) PCT No.: PCT/JP2015/001677
§ 371 (c)(1),
(2) Date: Oct. 7, 2016

(87) PCT Pub. No.: WO2015/155946
PCT Pub. Date: Oct. 15, 2015

(65) Prior Publication Data
US 2017/0036674 A1    Feb. 9, 2017

(30) Foreign Application Priority Data
Apr. 11, 2014    (JP) .................................. 2014-82082

(51) Int. Cl.
*B60W 10/00*    (2006.01)
*B60W 30/095*    (2012.01)
(Continued)

(52) U.S. Cl.
CPC ........ *B60W 30/0956* (2013.01); *B60W 50/14* (2013.01); *G05D 1/0238* (2013.01);
(Continued)

(58) Field of Classification Search
CPC ............. B60W 30/0956; B60W 50/14; B60W 2420/52; B60W 2050/146;
(Continued)

(56) References Cited

U.S. PATENT DOCUMENTS 9,290,174 B1 *    3/2016    Zagorski ................ B60K 28/06
9,481,287 B2 *    11/2016    Marti ...................... B60Q 1/00
(Continued)

FOREIGN PATENT DOCUMENTS

JP    2001-084496 A    3/2001
JP    2003-044983 A    2/2003
(Continued)

*Primary Examiner* — Erin M File
(74) *Attorney, Agent, or Firm* — Knobbe, Martens, Olson & Bear, LLP

(57) ABSTRACT

A recognition support system includes: an object detection device detecting an object that is located in a periphery of a host vehicle; a direction sensing device sensing a direction to which a driver intends to turn the host vehicle; a range setting device setting a notification range based on the direction sensed by the direction sensing device; a selecting device defining the object, which is detected by the object detecting device, as a specified object when the object moves independently from the host vehicle, and selecting the specified object, which is located within the notification range, to be presented to the driver based on a state of the specified object; and an information presenting device presenting an information enabling the driver to recognize the specified object selected by the selecting device.

17 Claims, 6 Drawing Sheets

(51) Int. Cl.
  *G08G 1/16*   (2006.01)
  *B60W 50/14*  (2012.01)
  *G05D 1/02*   (2006.01)

(52) U.S. Cl.
  CPC ............ *G05D 1/0278* (2013.01); *G08G 1/16* (2013.01); *G08G 1/166* (2013.01); *G08G 1/167* (2013.01); *B60W 2050/146* (2013.01); *B60W 2420/42* (2013.01); *B60W 2420/52* (2013.01); *B60W 2520/06* (2013.01); *B60W 2550/10* (2013.01)

(58) Field of Classification Search
  CPC ......... B60W 2520/06; B60W 2550/10; B60W 2420/42; G08G 1/166; G08G 1/16; G05D 1/0278; G05D 1/0238
  See application file for complete search history.

(56) References Cited

U.S. PATENT DOCUMENTS

| | | | | |
|---|---|---|---|---|
| 2007/0124027 | A1* | 5/2007 | Betzitza | B60W 40/02 701/1 |
| 2009/0303078 | A1 | 12/2009 | Mochizuki et al. | |
| 2010/0209890 | A1* | 8/2010 | Huang | G09B 19/167 434/65 |
| 2010/0209892 | A1* | 8/2010 | Lin | G09B 19/167 434/71 |
| 2012/0035825 | A1* | 2/2012 | Morita | B60T 7/22 701/70 |
| 2012/0062743 | A1* | 3/2012 | Lynam | B60Q 9/005 348/148 |
| 2012/0133769 | A1 | 5/2012 | Nagamine et al. | |
| 2013/0093888 | A1* | 4/2013 | Kim | G08B 21/06 348/148 |
| 2013/0155534 | A1* | 6/2013 | Sala | B60R 1/00 359/843 |
| 2013/0226408 | A1* | 8/2013 | Fung | B60W 40/09 701/41 |
| 2014/0098664 | A1* | 4/2014 | Mizuguchi | G08G 1/096716 370/230 |
| 2014/0118551 | A1 | 5/2014 | Ikeda et al. | |
| 2014/0132404 | A1* | 5/2014 | Katoh | B60R 21/013 340/436 |
| 2014/0267398 | A1* | 9/2014 | Beckwith | G08G 1/166 345/633 |
| 2015/0005982 | A1* | 1/2015 | Muthukumar | B60T 1/10 701/1 |
| 2015/0266455 | A1* | 9/2015 | Wilson | G08G 1/0112 701/93 |
| 2015/0294547 | A1* | 10/2015 | Ito | G08B 21/06 340/576 |
| 2016/0019807 | A1* | 1/2016 | Uchida | G09B 9/042 434/65 |
| 2016/0046298 | A1* | 2/2016 | DeRuyck | B60W 40/09 340/576 |
| 2016/0086040 | A1* | 3/2016 | Kuehnle | G06K 9/00805 382/103 |
| 2016/0358477 | A1* | 12/2016 | Ansari | G08G 1/167 |

FOREIGN PATENT DOCUMENTS

| | | |
|---|---|---|
| JP | 2006-317328 A | 11/2006 |
| JP | 2009-251758 A | 10/2009 |
| JP | 2011-044063 A | 3/2011 |
| JP | 2012-014527 A | 1/2012 |
| JP | 2012-014616 A | 1/2012 |

* cited by examiner

RECOGNITION SUPPORT SYSTEM

CROSS REFERENCE TO RELATED APPLICATION

This application is based on Japanese Patent Application No. 2014-82082 filed on Apr. 11, 2014, the disclosure of which is incorporated herein by reference.

TECHNICAL FIELD

The present disclosure relates to a recognition support system enabling a driver to recognize a situation of a position where a vehicle is about to turn.

BACKGROUND ART

It has been known a device that senses an obstacle in a direction to which a vehicle turns and that provides a warning based on the sensing result of the obstacle when a condition that the vehicle approaches an intersection is satisfied (see, patent literature 1).

Since the conventional device provides the warning for a less-dangerous obstacle located within the sensing range, there is a possibility to bother a driver in such a case.

PRIOR ART LITERATURE

Patent Literature 1: JP 2001-84496 A

SUMMARY OF INVENTION

It is an object of the present disclosure to provide a recognition support system that accurately selects information presented to a driver at an intersection and that reduces inconvenience of the driver.

According to an aspect of the present disclosure, a recognition support system includes: an object detection device detecting an object that is located in a periphery of a host vehicle; a direction sensing device sensing a direction to which a driver intends to turn the host vehicle; a range setting device setting a notification range based on the direction sensed by the direction sensing device; a selecting device defining the object, which is detected by the object detecting device, as a specified object when the object moves independently from the host vehicle, and selecting the specified object, which is located within the notification range, to be presented to the driver based on a state of the specified object; and an information presenting device presenting an information enabling the driver to recognize the specified object selected by the selecting device.

According to the structure, the recognition support system selects the range and the object to be presented based on the turning direction, the category of the object and the state of the object, so as to reduce driver's inconvenience caused by unnecessary information. Further, since the recognition support system does not select only one object to be presented, but presents information of plural objects, the recognition support system allows the driver to finally determine the handling of the specified object.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Embodiments of the present disclosure will be described with reference to drawings.

<Entire Structure>

Figure 1:
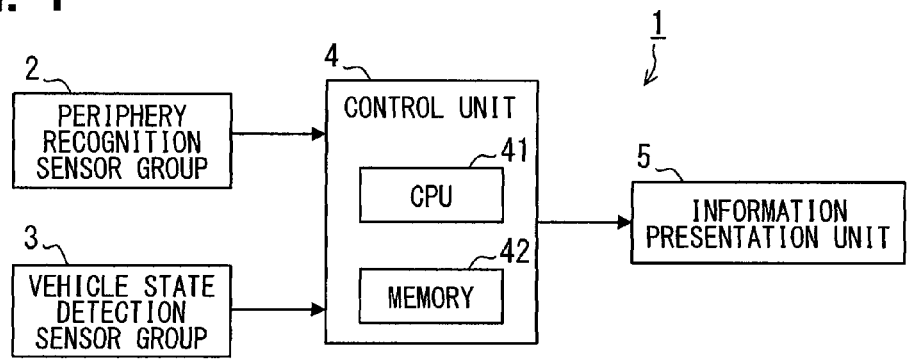
FIG. 1 is a block diagram illustrating an entire structure of a recognition support system.

As shown in FIG. 1, a recognition support system 1 includes a periphery recognition sensor group 2, a vehicle state detection sensor group 3, a control unit 4 and an information presentation unit 5.

Figure 2:
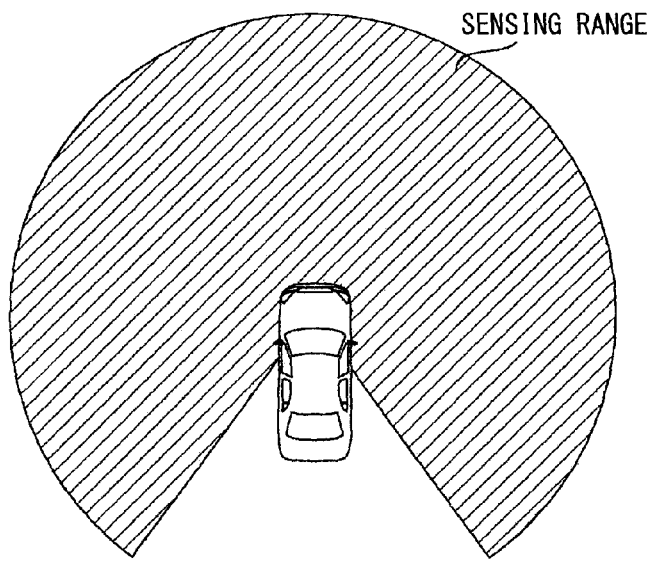
FIG. 2 is a diagram for explaining a sensing range of a periphery recognition sensor group.

The periphery recognition sensor group 2 includes an image sensor that films a periphery of a vehicle to detect objects, a radar sensor that detects distance and relative speed of the objects and the vehicle using millimeter waves and sonic waves, a GPS sensor and a locator that detect a current position of the vehicle. As shown in FIG. 2, a sensing range of the periphery recognition sensor group 2 is set to include an entire periphery of the vehicle excepting a portion behind the vehicle (for example, a range of plus and minus 20 degrees behind the vehicle).

The vehicle state detection sensor group 3 includes at least a direction indicator sensor that detects at least an operation state of a direction indicator, and a speed sensor that detects speed of the vehicle.

Figure 3:
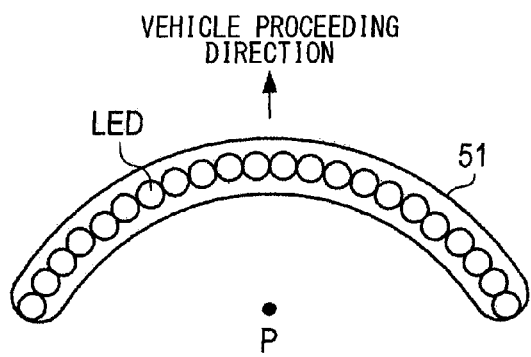
FIG. 3 is a diagram for explaining a structure of a recognition support information presenting unit.

The information presentation unit 5 includes a display that displays an image and a letter, and a lamp or a buzzer that visually and auditorily warns the drivers. In the present embodiment, as shown in FIG. 3, the information presentation unit 5 includes a recognition support information presenting unit 51 provided by light emitting units LED that emit several color lights and are arranged in arc line.

The control unit 4 includes a known microcomputer having at least a CPU 41 and a memory 42, and executes at least an object detection processing, a recognition support activation processing, and a recognition support processing.

<Processing>

The object detection processing is repeatedly executed while the control unit 4 is turned on. In the object detection processing, at least a specified object, a pedestrian crossing and a guard rail located within the sensing range are detected using the detection result of the periphery recognition sensor group 2. The specified object is an object that moves independently from the host vehicle, and, in the present embodiment, the specified object is a pedestrian or a bicycle.

In the object detection processing, moving speed of the specified object is also detected.

The recognition support activation processing is repeatedly executed while the control unit 4 is turned on. The recognition support activation processing activates the recognition support processing when the host vehicle, in which the recognition support system 1 is mounded, detects that the driver intends to turn the vehicle at the intersection, and when the vehicle state detection sensor group 3 determined that the state of the host vehicle satisfies a predetermined activation condition. The activation condition is satisfied when a time period until the host vehicle reaches the intersection, at which the driver intends to turn the host vehicle, or a distance from the host vehicle to the intersection is estimated to be equal to or less than a threshold value. Since the activation condition is remotely related to the main part of the present disclosure, detail descriptions thereof will be omitted.

Figure 4:
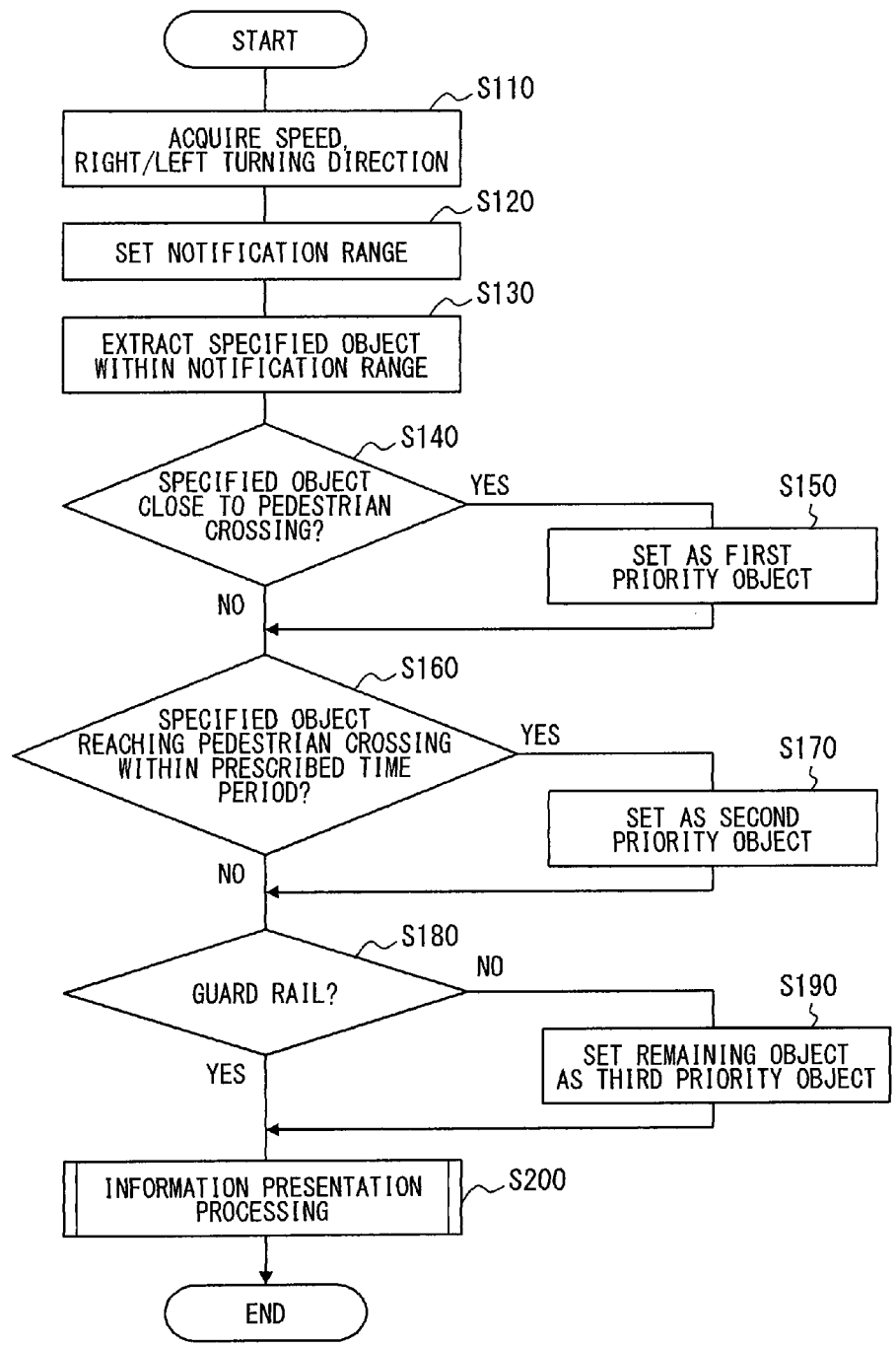
FIG. 4 is a flow chart for explaining contents of a recognition support processing.

The details of the recognition support processing, which is activated by the recognition support activation processing, will be described in line with a flowchart shown in FIG. 4. The CPU 41 repeatedly executes the recognition support processing after the recognition support activation processing activates the recognition support processing until the host vehicle finishes the tuning.

When the recognition support processing is activated, at S110, the CPU 41 acquires a speed (i.e., vehicle speed) of the host vehicle and a turning direction to which the host vehicle is about to turn at the intersection from the vehicle state detection sensor group 3.

Figure 5:
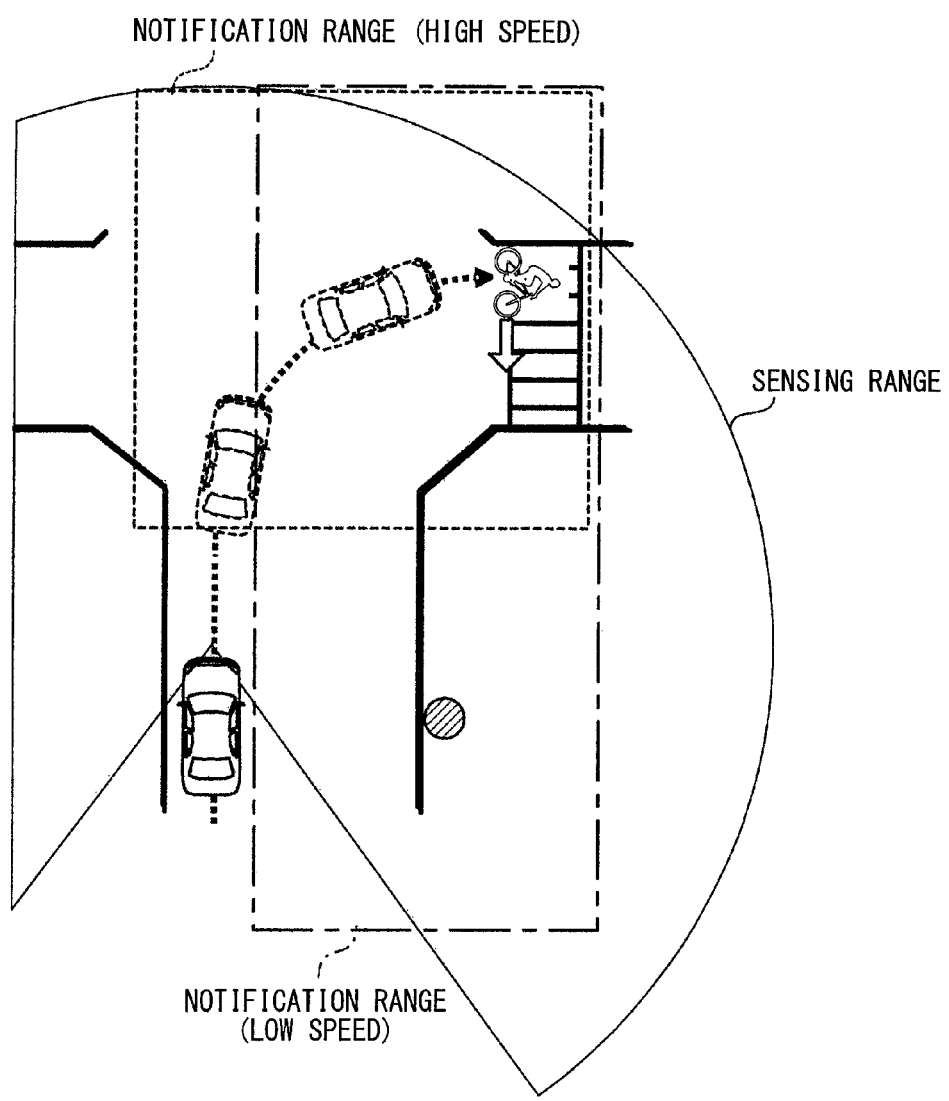
FIG. 5 is a diagram for explaining a setting of a notification range.

At S120, a notification range, for which the recognition support processing is executed, is set based on the vehicle speed and the turning direction of the host vehicle acquired at S110. Specifically, for example, when the turning direction indicates right, as shown in FIG. 5, the notification range is set to focus on a right side of the host vehicle. When the vehicle speed is lower than the predetermined threshold speed, the notification range is broadly set to include, in a front and back direction, the intersection in front of the host vehicle and the area within the driver's field of vision behind the host vehicle. The notification range is set to include, across an opposing lane, in a right and left direction (i.e., a direction along a width of the host vehicle), a left side of the host vehicle and the intersection located ahead of the host vehicle that is about to turn right. As the vehicle speed increases, the notification range is reduced in the front and back direction (i.e., the range behind the host vehicle is reduced) and the notification range is increased toward the left side of the host vehicle in the right and left direction.

At S130, based on the result of the object detection processing, the specified object, the pedestrian crossing, the guard rail and the like located within the notification range, which is set at S120, are extracted.

At S140, it is determined whether there is a specified object close to the pedestrian crossing, which is located ahead of the host vehicle that is about to turn, or a specified object close to an entrance to a road, which is located ahead of the host vehicle (hereinafter, "the pedestrian crossing and the like" means to include the pedestrian crossing and the entrance to the road). In the present embodiment, a region close to the pedestrian crossing and the like means to a region within a predetermined range (for example, equal to or less than 2 meters) from the pedestrian crossing and both ends of the pedestrian crossing, or a region corresponding to the region described above when there is no pedestrian crossing. When there is the specified object close to the pedestrian crossing and the like (S140: YES), the specified object is set as a first priority object at S150. Conversely, when there is no specified object close to the pedestrian crossing and the like (S140: NO), the processing of S150 is skipped and the processing proceeds to S160. Setting the specified object as the first priority object means that it is necessary to pay attention to the specified object that is crossing the pedestrian crossing and the like, and the specified object that is located close to the pedestrian crossing and that has a possibility of crossing. For example, in the situations shown in FIG. 6A, FIG. 7A, and FIG. 8A, specified objects A and B among the specified objects A to D are set as the first priority object.

As S160, it is determined that there is a specified object, other than the first priority object, that has a possibility of entering the pedestrian crossing within a predetermined time period. This determination is executed based on a position of the specified object and the moving speed of the specified object.

When there is such a specified object (S160: YES), the specified object is set as a second priority object at S170. Conversely, when there is not such a specified object (S160: NO), the processing of S170 is skipped and the processing proceeds to S180. Setting the specified object as the second priority object means that it is necessary to pay attention to the specified object that is not located close to the pedestrian crossing and the like, but has a possibility of crossing the pedestrian crossing at a time point when the host vehicle reaches the pedestrian crossing because the moving speed of the specified object is high. For example, in the situation shown in FIG. 7A, a specified object A among the specified objects A, C and D is set as the second priority object.

As S180, it is determined whether there is a guard rail between the specified object and the host vehicle. When there is no guard rail between the specified object and the host vehicle (S180: NO), the specified object other than the first priority object and the second priority object is set as a third priority object at S190. Conversely, when there is a guard rail between the specified object and the host vehicle (S180: YES), the processing of S190 is skipped and the processing proceeds to S200. That is, when there is the guard rail between the specified object and the host vehicle, the specified object is less likely to approach the host vehicle across the guard rail. Therefore, the specified object is excluded from the object that should be aware of, and the other specified object is set as a third priority object. For example, in the situations shown in FIG. 6A and FIG. 7A, since there is no guard rail, the specified object C is set as the third priority object. In the situation shown in FIG. 8A, guard rail is located between the specified object C and the host vehicle and the specified object C is not close to the pedestrian crossing and the like. Therefore, the specified object C is not set as the third priority object and is excluded from the object that should be aware of.

At S200, the processing of presenting information of the first to third priority object, using the recognition support information presenting unit 51, is executed and the processing is finished.

In the information presentation processing, the first priority object has the highest priority and the third priority object has the lowest priority. A predetermined number of specified objects having higher priority (for example, three objects in the present embodiment) are selectively presented. Specifically, in FIG. 3, the host vehicle is located at a position P. When a vertical direction in FIG. 3 is defined as a vehicle proceeding direction, the light emitting unit LED, corresponding to a direction in which the specified object is located, is lit up in a color depending on the priority.

As such, the driver recognizes that the specified object is located in the direction indicated by the light spot. When there are plural second priority objects, the one out of the driver's field of vision has higher priority than the one within the driver's field of vision. When there are plural third priority objects, the one located closer to the intersection has higher priority.

Figure 6A:
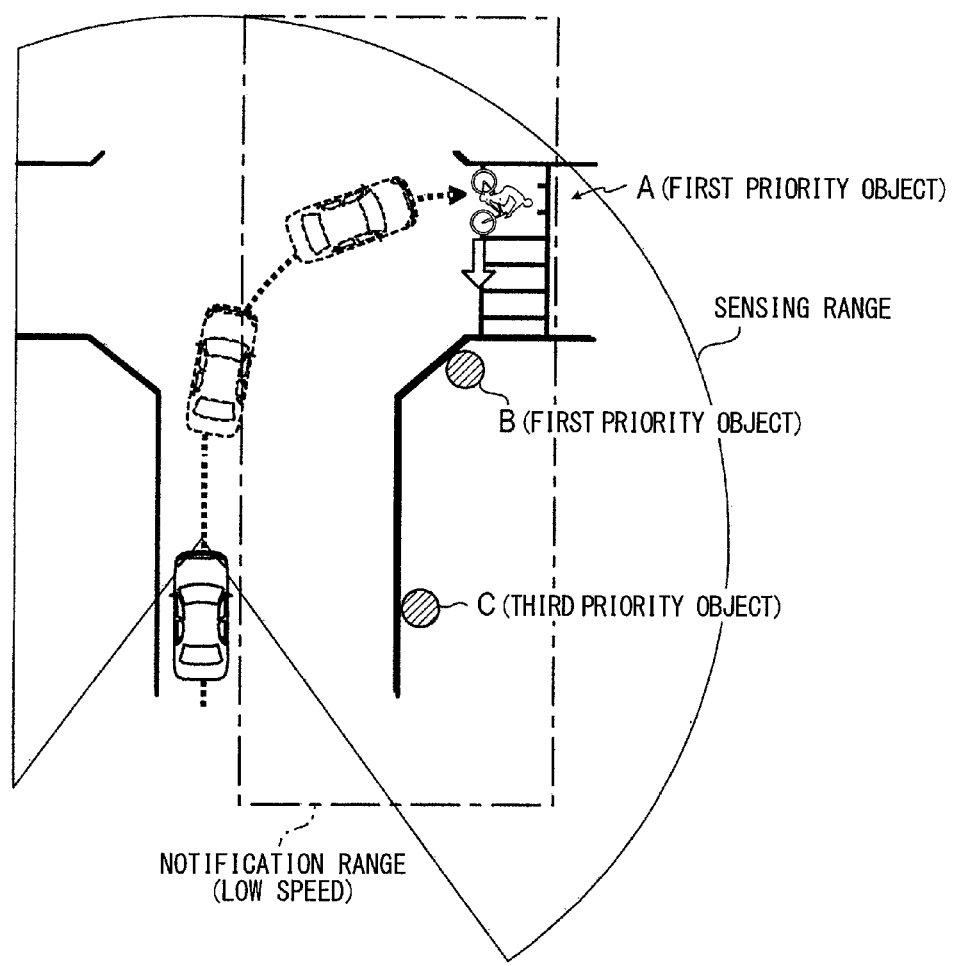
FIG. 6A is a diagram for explaining a first priority object and a third priority object.
Figure 6B:
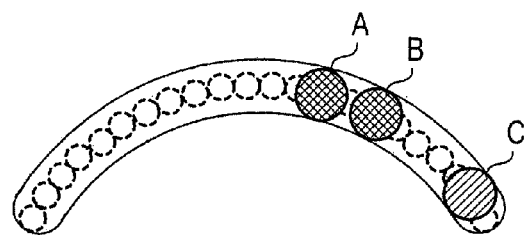
FIG. 6B is a diagram for explaining an example of an information presentation in a case shown in FIG. 6A.
Figure 7A:
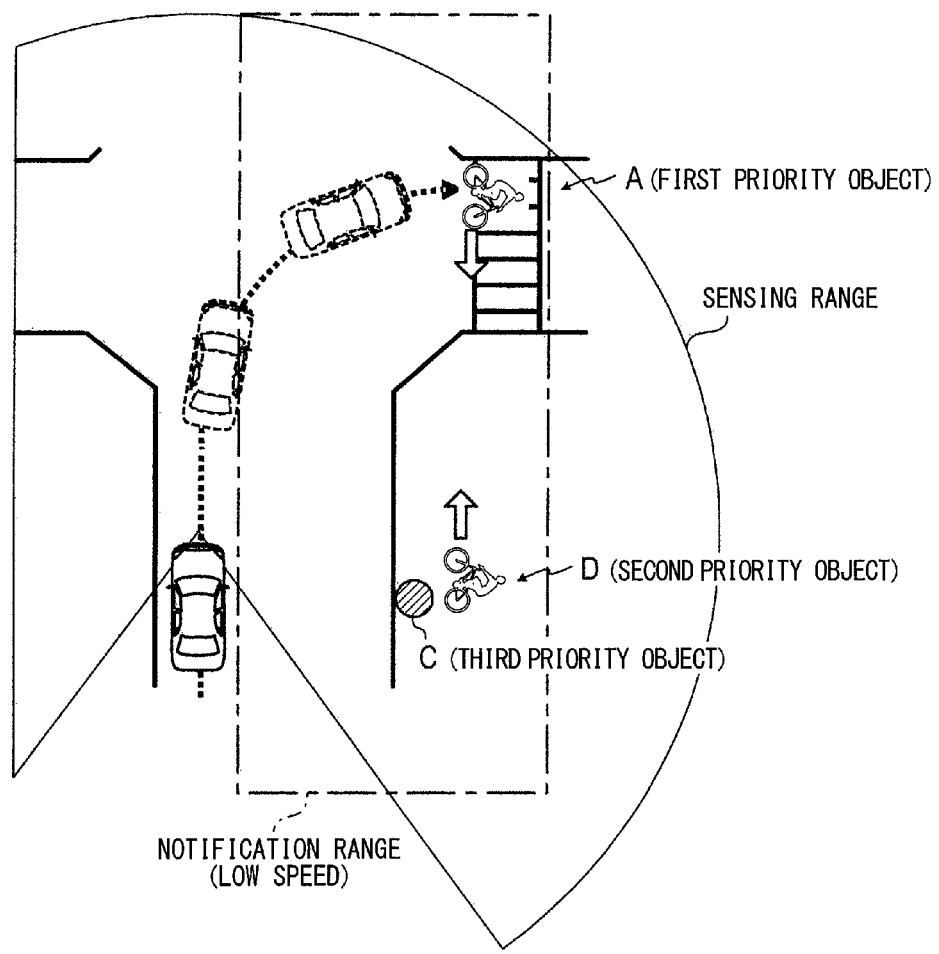
FIG. 7A is a diagram for explaining a first priority object, a second priority object and a third priority object.
Figure 7B:
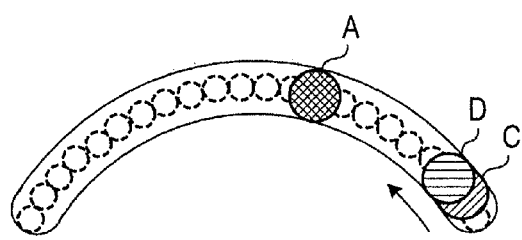
FIG. 7B is a diagram for explaining an example of an information presentation in a case shown in FIG. 7A.
Figure 8A:
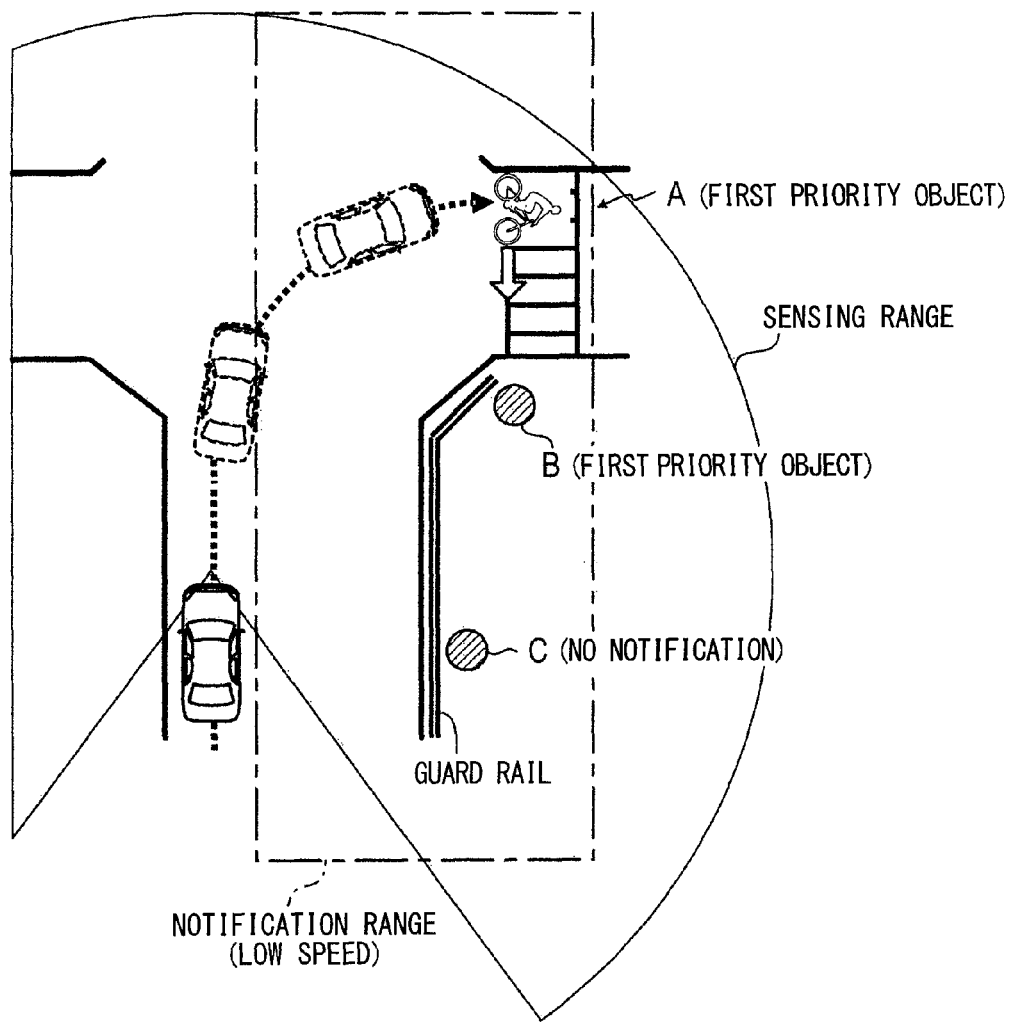
FIG. 8A is a diagram for explaining a first priority object and an excluded object.
Figure 8B:
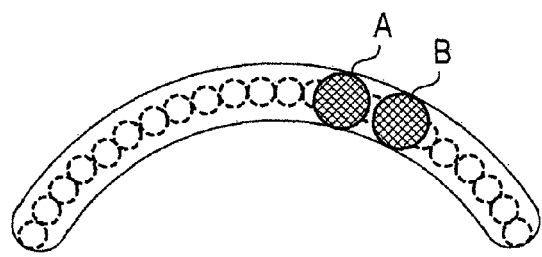
FIG. 8B is a diagram for explaining an example of an information presentation in a case shown in FIG. 8A.

Specifically, in the situations shown in FIG. 6A, FIG. 7A and FIG. 8A, the recognition support information presenting unit 51 presents the information as shown in FIG. 6B, FIG. 7B and FIG. 8B. In FIG. 6B, FIG. 7B and FIG. 8B, hatched circles represent the light spots each indicating that the corresponding light emitting unit LED is lit, and patterns of the hatching indicate difference of colors. As shown in FIG. 7B, regarding the second priority object with high moving speed (i.e., the specified object D), the light spot is presented to flow along an arrow in FIG. 7B. In the situation shown in FIGS. 8A and 8B, the specified object C is excluded, and the recognition support information presenting unit 51 presents the light spot corresponding to the specified objects A and B.

<Effects>

As described above, the recognition support system 1 narrows the notification range based on the turning direction of the host vehicle, selects the objects to be presented depending on the category of the objects, sets the priority of the objects depending on the state of the objects and reduces the objects to be presented. The recognition support system 1 reduces driver's inconvenience caused by unnecessary information. Further, since the recognition support system 1 does not select only one object to be presented, but presents plural objects having high priority, the recognition support system 1 allows the driver to finally determine the handling of the specified object.

For example, in the case of right turning, when a driver recognizes that there is a pedestrian or a bicycle in a pedestrian crossing located ahead of the host vehicle that is about to turn right, the driver immediately determines not to proceed the host vehicle regardless of the presence of an oncoming vehicle. Further, the situation, in which the driver pays too much attention to the road ahead of the host vehicle and ignores the oncoming vehicle, is restricted. Conversely, the situation, in which the driver pays too much attention to the oncoming vehicle and ignores the road located ahead of the host vehicle, is restricted.

<Other Embodiments>

Although the embodiment of the present disclosure is described hereinabove, the present disclosure is not limited to the embodiment described above and may be implemented in various other ways.

(1) In the above embodiment, a case in which the periphery recognition sensor group 2 recognizes the objects well is described. When it is estimated that the periphery recognition sensor group 2 does not recognizes the objects well due to some obstacle such as oncoming vehicle or the like, the situation may be notified to cause the driver's attention.

(2) The members of the present disclosure are just conceptional members and the present disclosure is not limited to the members. For example, a function of one of the members may be dispersed in plural members, or functions of the plural members may be combined in the one of the members. Also, at least one of the members of the above embodiments may be replaced by a well-known member having the similar function. Furthermore, at least one of the members of the above embodiments may be added to the other embodiments, or at least one of the members of the above embodiments may be replaced in the other embodiments.

The present disclosure may be implemented in ways, other than the above recognition support system, such as a program allowing a computer to function as devices providing the recognition support system.

It is noted that a flowchart or the processing of the flowchart in the present disclosure includes sections (also referred to as steps), each of which is represented, for instance, as S110. Further, each section can be divided into several sub-sections, while several sections can be combined into a single section. Furthermore, each of thus configured sections can be also referred to as a device, module, or means.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

The invention claimed is:

1. A recognition support system comprising:
   an object detecting device detecting an object that is located in a periphery of a host vehicle;
   a direction sensing device sensing a direction to which a driver intends to turn the host vehicle;
   a range setting device setting a notification range based on the direction sensed by the direction sensing device;
   a selecting device defining the object, which is detected by the object detecting device, as a specified object when the object moves independently from the host vehicle, and selecting the specified object, which is located within the notification range, to be presented to the driver based on a state of the specified object; and
   an information presenting device presenting an information enabling the driver to recognize the specified object selected by the selecting device, wherein
   the selecting device defines the specified object as a first priority object that is preferentially presented to the driver, when the specified object is located within a predetermined range including a pedestrian crossing located ahead of the host vehicle that is about to turn,
   the selecting device defines the specified object as a second priority object that is preferentially presented to the driver, when the specified object is estimated to enter the pedestrian crossing within a predetermined time period, and
   the second priority object located out of driver's field of vision is presented more preferentially.

2. The recognition support system according to claim 1, wherein:
   the range setting device broadens the notification range as a speed of the host vehicle increases.

3. The recognition support system according to claim 1, wherein:
   the selecting device defines the specified object as a third priority object that is preferentially presented to the driver, when the specified object is located at a position without a guard rail.

4. The recognition support system according to claim 1, wherein:
   the specified object is one of a pedestrian and a bicycle.

5. A recognition support system comprising:
   an object detecting device detecting an object that is located in a periphery of a host vehicle;
   a direction sensing device sensing a direction to which a driver intends to turn the host vehicle;

a range setting device setting a notification range based on the direction sensed by the direction sensing device;

a selecting device defining the object, which is detected by the object detecting device, as a specified object when the object moves independently from the host vehicle, and selecting the specified object, which is located within the notification range, to be presented to the driver based on a state of the specified object; and an information presenting device presenting an information enabling the driver to recognize the specified object selected by the selecting device, wherein the selecting device defines the specified object as a first priority object that is preferentially presented to the driver, when the specified object is estimated to enter a pedestrian crossing located ahead of the host vehicle that is about to turn, and when the first priority object is located out of driver's field of vision, the first priority object located out of the driver's field of vision is more preferentially presented to the driver than the first priority object located within the driver's field of vision.

6. The recognition support system according to claim 5, wherein:

the range setting device broadens the notification range as a speed of the host vehicle increases.

7. The recognition support system according to claim 5, wherein:

the selecting device defines the specified object as a second priority object that is preferentially presented to the driver, when the specified object is located within a predetermined range including a pedestrian crossing located ahead of the host vehicle that is about to turn.

8. The recognition support system according to claim 7, wherein:

the second priority object is more preferentially presented to the driver than the first priority object.

9. The recognition support system according to claim 5, wherein:

the selecting device defines the specified object as a third priority object that is preferentially presented to the driver, when the specified object is located at a position without a guard rail.

10. The recognition support system according to claim 9, wherein:

the first priority object is more preferentially presented to the driver than the third priority object.

11. The recognition support system according to claim 5, wherein:

the specified object is one of a pedestrian and a bicycle.

12. A recognition support system comprising:

an object detecting device detecting an object that is located in a periphery of a host vehicle;

a direction sensing device sensing a direction to which a driver intends to turn the host vehicle;

a range setting device setting a notification range based on the direction sensed by the direction sensing device;

a selecting device defining the object, which is detected by the object detecting device, as a specified object when the object moves independently from the host vehicle, and selecting the specified object, which is located within the notification range, to be presented to the driver based on a state of the specified object; and an information presenting device presenting an information enabling the driver to recognize the specified object selected by the selecting device, wherein the selecting device defines the specified object as a first priority object that is preferentially presented to the driver, when the specified object is located within a predetermined range including a pedestrian crossing located ahead of the host vehicle that is about to turn, the selecting device defines the specified object other than the first priority object as a second priority object that is preferentially presented to the driver, when a guard rail is not located between the specified object other than the first priority object and the host vehicle, and the selecting device defines the specified object other than the first priority object as a non-presented object that is not to be presented to the driver, when the guard rail is located between the specified object other than the first priority object and the host vehicle.

13. The recognition support system according to claim 12, wherein:

the range setting device broadens the notification range as a speed of the host vehicle increases.

14. The recognition support system according to claim 12, wherein:

the selecting device defines the specified object as a third priority object that is preferentially presented to the driver, when the specified object is estimated to enter the pedestrian crossing within a predetermined time period.

15. The recognition support system according to claim 14, wherein:

when the third priority object is located out of driver's field of vision, the third priority object located out of driver's field of vision is more preferentially presented to the driver than the third priority object located within the driver's field of vision.

16. The recognition support system according to claim 14, wherein:

the first priority object is more preferentially presented to the driver than the third priority object, and the third priority object is more preferentially presented to the driver than the second priority object.

17. The recognition support system according to claim 12, wherein:

the specified object is one of a pedestrian and a bicycle.

* * * * *